(12) United States Patent
Lu

(10) Patent No.: US 6,676,290 B1
(45) Date of Patent: Jan. 13, 2004

(54) ELECTRONIC CLINICAL THERMOMETER

(76) Inventor: Hsueh-Yu Lu, 5F-23, 70, Fu-Shing Road, Taoyuan (TW)

( * ) Notice: Subject to any disclaimer, the term of this patent is extended or adjusted under 35 U.S.C. 154(b) by 0 days.

(21) Appl. No.: 10/294,648

(22) Filed: Nov. 15, 2002

(51) Int. Cl.⁷ .............................. G01K 1/12; G01K 1/16; G01K 7/16; A61B 5/01
(52) U.S. Cl. ........................ 374/163; 374/208; 374/185; 600/549
(58) Field of Search .................. 374/163, 185, 374/170, 183; 600/549

(56) References Cited

U.S. PATENT DOCUMENTS

| | | | |
|---|---|---|---|
| 2,818,482 A | * 12/1957 | Bennett | |
| 3,681,993 A | * 8/1972 | Campton et al. | 73/362 AR |
| 4,453,835 A | * 6/1984 | Clawson et al. | 374/185 |
| 4,590,669 A | * 5/1986 | Imamura | 29/612 |
| 4,603,026 A | * 7/1986 | Martin | 264/272.18 |
| 4,688,949 A | * 8/1987 | Hatakenaka | 374/183 |
| 4,743,121 A | * 5/1988 | Takagi et al. | 374/163 |
| 5,013,161 A | * 5/1991 | Zaragoza et al. | 374/208 |
| 5,367,282 A | * 11/1994 | Clem | 338/22 R |
| 6,068,399 A | * 5/2000 | Tseng | 374/163 |
| 6,338,571 B1 | * 1/2002 | Chen | 374/208 |
| 6,419,388 B2 | * 7/2002 | Lee | 374/208 |
| 2002/0090020 A1 | * 7/2002 | Yu | 374/208 |
| 2003/0002561 A1 | * 1/2003 | Yu | 374/164 |
| 2003/0128738 A1 | * 7/2003 | Chen | 374/185 |

FOREIGN PATENT DOCUMENTS

| | | | |
|---|---|---|---|
| JP | 03118432 A | * 5/1991 | 374/163 |

* cited by examiner

*Primary Examiner*—Gail Verbitsky
(74) *Attorney, Agent, or Firm*—Troxell Law Office PLLC

(57) ABSTRACT

An electronic clinical thermometer includes an elongated shell, a metal tip in one end of the shell, a circuit board mounted within the shell, a temperature sensor mounted in the top of the metal tip for producing a signal indicative of the temperature of the metal tip, two conducting wires connected in parallel between the temperature sensor and the circuit board, and a heat insulator stuffed in the metal tip to hold down the temperature sensor and the conducting wires against the inside wall of the metal tip and to present a temperature loss during measuring of the electronic clinical thermometer.

4 Claims, 5 Drawing Sheets

ELECTRONIC CLINICAL THERMOMETER

BACKGROUND OF THE INVENTION

1. Field of the Invention

The present invention relates to an electronic clinical thermometer and, more specifically, to such an electronic clinical thermometer, which rapidly and accurately measures the body temperature of the patient.

2. Description of the Related Art

Regular clinical thermometers have two types, namely, the mercury clinical thermometers and the electronic clinical thermometers. A mercury thermometer must be properly disposed of after its service because mercury is severely harmful to the environment. U.S. Pat. No. 6,419,388 B2, entitled "Medical Thermometer" is of an electronic type, which comprises a metal tip with an outer contact surface for contacting the tissue of a patient, a temperature sensor mounted within the metal tip and used to produce a signal which represents the temperature of the metal tip (see FIG. 1). When using an electronic clinical thermometer to measure the body temperature of a patient, the probe tip of the electronic thermometer must be kept in close contact with the body of the patient for a certain length of time, for example, about 1~2 minutes so that accurately test value can be obtained. Because the shell of an electronic clinical thermometer absorbs heat from the probe tip, it takes time to let the temperature level of the probe tip be in balance with the body temperature of the patient.

SUMMARY OF THE INVENTION

The present invention has been accomplished to provide a quick response probe for an electronic clinical thermometer, which eliminates the aforesaid drawbacks. It is one object of the present invention to provide an electronic clinical thermometer, which prevents temperature loss during measuring. It is another object of the present invention to provide an electronic clinical thermometer, which enables the temperature sensor to be quickly heated to the saturated status so as to accurately produce a signal indicative of the body temperature of the patient. To achieve these and other objects of the present invention, the electronic clinical thermometer comprises a heat insulator stuffed into a metal tip in one end of the shell thereof to hold down a temperature sensor in the top of the metal tip and two conducting wires, for enabling the temperature sensor to be quickly heated to the saturated status when measuring the body temperature of a patient, so that the signal indicative of the body temperature of the patient can be quickly produced and transmitted from the temperature sensor through the conducting wires to a circuit board inside the shell of the electronic clinical thermometer.

DETAILED DESCRIPTION OF THE PREFERRED EMBODIMENT

Figure 1:
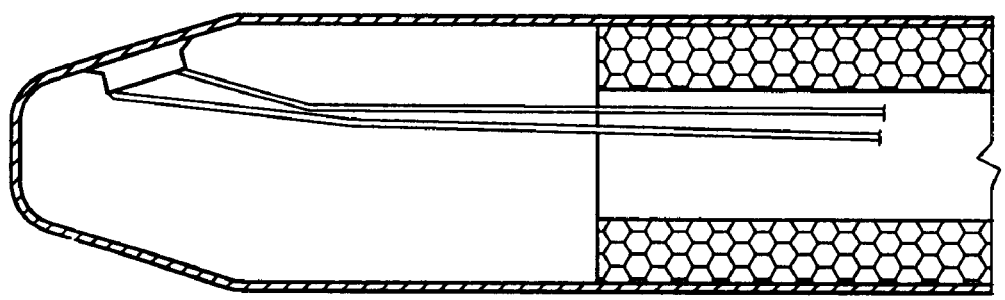
FIG. 1 is a sectional view of a probe for a medical thermometer according to, the prior art.
Figure 2:
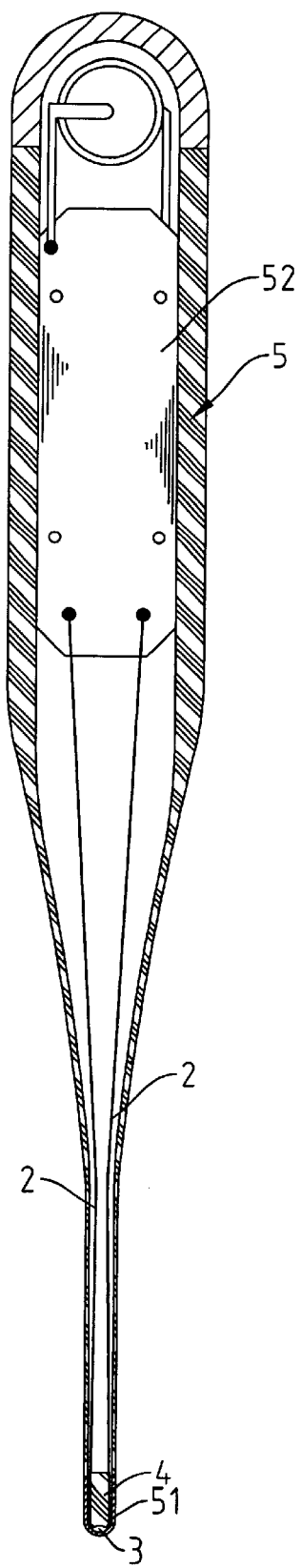
FIG. 2 is a sectional view of an electronic clinical thermometer according to the present invention.
Figure 3:
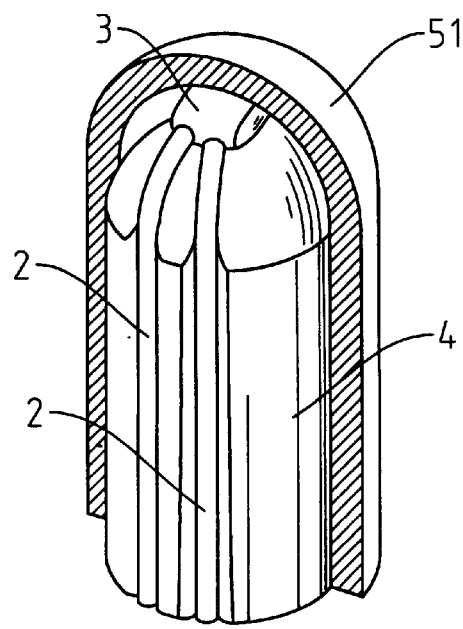
FIG. 3 is a cutaway, in an enlarged scale, of the front probe of the electronic clinical thermometer according to the present invention.

Referring to FIGS. 2 and 3, a quick-response electronic clinical thermometer is shown comprising an elongated shell 5, a metal tip 51 installed in one end of the shell 5, a circuit board 52 mounted within the shell 5, a temperature sensor (for example, a temperature sensitive resistor) 1 mounted in the top of the metal tip 51 and fixedly secured to the inside wall of the metal tip 51 with a drop of glue 3 for producing a signal indicative of the temperature of the metal tip 51, and two conducting wires 2 connected in parallel between the temperature sensor 1 and the circuit board 52. Further, a heat insulator 4 is stuffed in the metal tip 51 to hold down the temperature sensor 1 and the conducting wires 2 against the inside wall of the metal tip 51.

Figure 4:
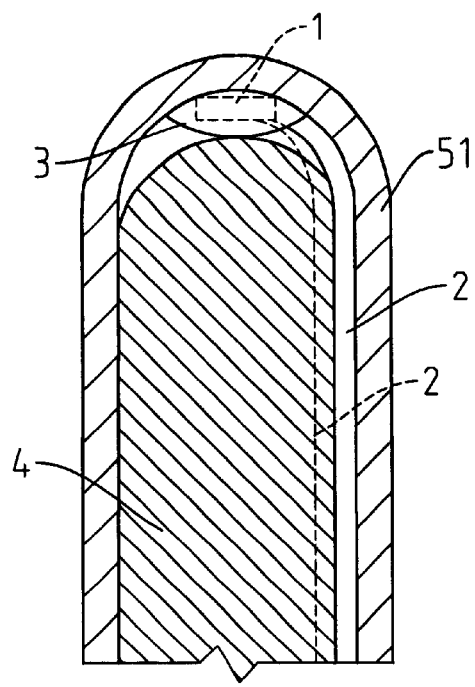
FIG. 4 is a sectional plain view of FIG. 4.
Figure 5:
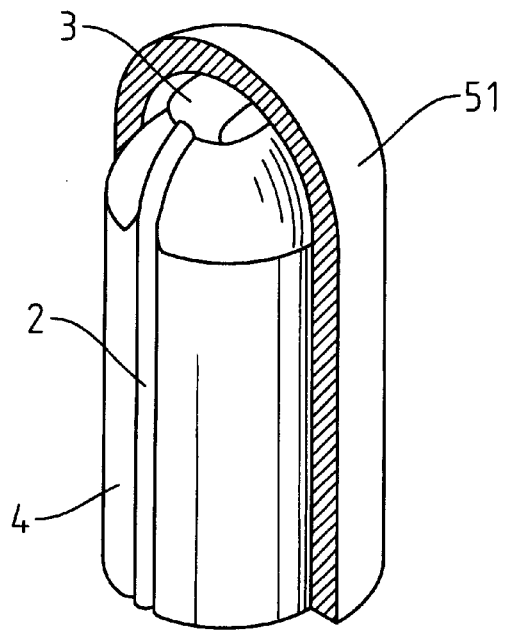
FIG. 5 is a cutaway of an alternate form of the front probe of the electronic clinical thermometer according to the present invention.
Figure 6:
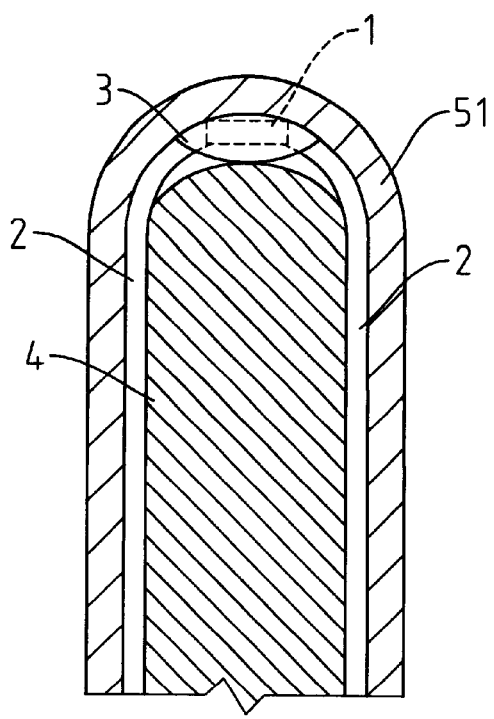
FIG. 6 is a sectional plain view of FIG. 5.

The two conducting wires 2 may be arranged in parallel at one side and closely attached to the inside wall of the metal tip 51 as shown in FIGS. 3 and 4. Alternatively, the two conducting wires 2 may be extended from the temperature sensor 1 in reversed directions and closely attached to the inside wall of the metal tip 51 at two sides. Because the inside space of the metal tip 51 is stuffed with the heat insulator 4, the temperature sensor 1 and the conducting wires 2 are simultaneously heated by the body temperature of the patient when the metal tip 51 attached to the body of the patient, i.e., preventing a temperature difference between the temperature sensor 1 and the conducting wires 2.

When the metal tip 51 inserted into the oral cavity or attached to one armpit of a patient, the metal tip 51, the temperature sensor 1 and the conducting wires 2 receive heat energy from the body of the patient approximately at the same time, and therefore the temperature sensor 1 is rapidly heated to the saturated status where the temperature sensor 1 produce a signal indicative of the body temperature of the patient. Further, because the conducting wires 2 are closely attached to the inside wall of the metal tip 51, it absorbs the heat energy of the body of the patient through the metal tip 51 without carrying heat energy from the temperature sensor 1. Further, the heat insulator 4 prevents loss of heat energy during measuring.

Figure 7:
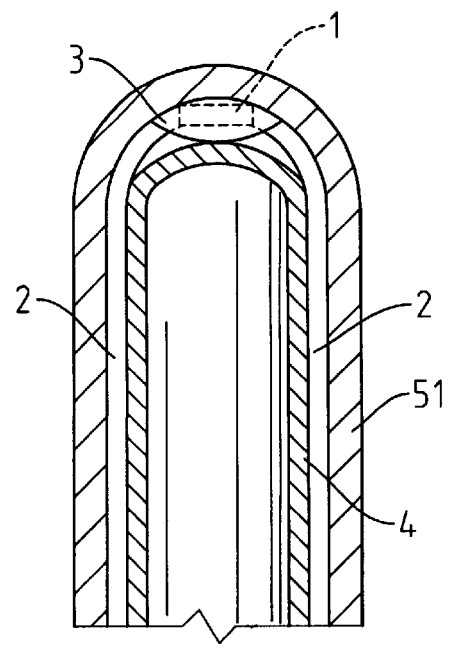
FIG. 7 is a sectional view showing an alternate form of the heat insulator according to the present invention.
Figure 8:
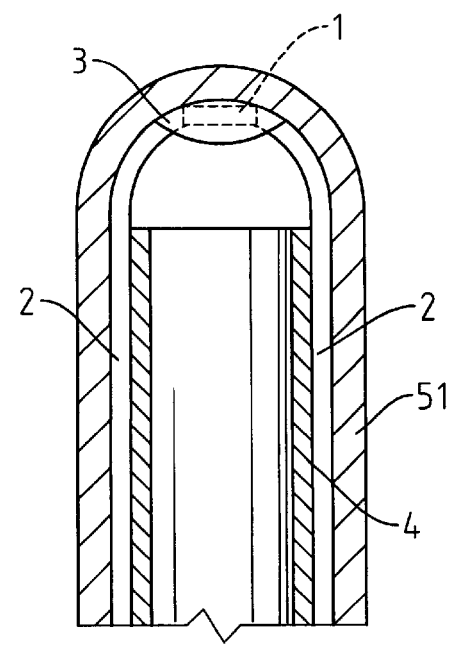
FIG. 8 is a sectional view showing another alternate form of the heat insulator according to the present invention.

Referring to FIGS. 7 and 8, the heat insulator 4 can be a tubular plug member fitted into the inside of the metal tip 51 to hold down the temperature sensor 1 and the conducting wires 2.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An electronic clinical thermometer comprising an elongated shell, a metal tip installed in one end of said shell, said metal tip having an inside wall, a circuit board mounted within said shell, a temperature sensor mounted in a top of said metal tip and fixedly secured to the inside wall of said metal tip with a drop of glue for producing a signal indicative of the temperature of said metal tip, and two conducting wires connected in parallel between said temperature sensor and said circuit board, wherein a heat insulator is stuffed in said metal tip to hold down said temperature sensor and said conducting wires, keeping said temperature sensor and said conducting wires in contact with the inside wall of said metal tip.

2. The electronic clinical thermometer as claimed in claim 1, wherein said conducting wires are arranged in parallel and attached to the inside wall of said metal tip at one side.

3. The electronic clinical thermometer as claimed in claim 1, wherein said conducting wires are extended from said temperature sensor in reversed directions and attached to the inside wall of said metal tip at two sides.

4. The electronic clinical thermometer as claimed in claim 1, wherein said heat insulator is a tubular plug member fitted into said metal tip to hold down said temperature sensor and said conducting wires.

* * * * *

(12) INTER PARTES REEXAMINATION CERTIFICATE (0061st)
United States Patent
Lu

(10) Number: US 6,676,290 C1
(45) Certificate Issued: Apr. 28, 2009

(54) ELECTRONIC CLINICAL THERMOMETER

(76) Inventor: Hsueh-Yu Lu, 5F-23, 70, Fu-Shing Road, Taoyuan (TW)

Reexamination Request:
No. 95/000,113, Oct. 19, 2005

Reexamination Certificate for:
Patent No.: 6,676,290
Issued: Jan. 13, 2004
Appl. No.: 10/294,648
Filed: Nov. 15, 2002

(51) Int. Cl.
*G01K 1/18* (2006.01)
*G01K 1/00* (2006.01)

(52) U.S. Cl. .......... 374/163; 374/208; 374/185; 374/E1.022; 600/549

(58) Field of Classification Search .......... None
See application file for complete search history.

(56) References Cited

U.S. PATENT DOCUMENTS

| | | | |
|---|---|---|---|
| 2,012,112 A | 8/1935 | States | 136/4 |
| 3,402,378 A | 9/1968 | Catlin et al. | 338/28 |
| 4,411,535 A | 10/1983 | Schwarzschild | 374/165 |
| 6,068,399 A | 5/2000 | Tseng | 374/163 |
| 6,419,388 B2 | 7/2002 | Lee | 374/208 |

FOREIGN PATENT DOCUMENTS

JP        03118432        *  5/1991

* cited by examiner

*Primary Examiner*—Margaret Rubin

(57) ABSTRACT

An electronic clinical thermometer includes an elongated shell, a metal tip in one end of the shell, a circuit board mounted within the shell, a temperature sensor mounted in the top of the metal tip for producing a signal indicative of the temperature of the metal tip, two conducting wires connected in parallel between the temperature sensor and the circuit board, and a heat insulator stuffed in the metal tip to hold down the temperature sensor and the conducting wires against the inside wall of the metal tip and to present a temperature loss during measuring of the electronic clinical thermometer.

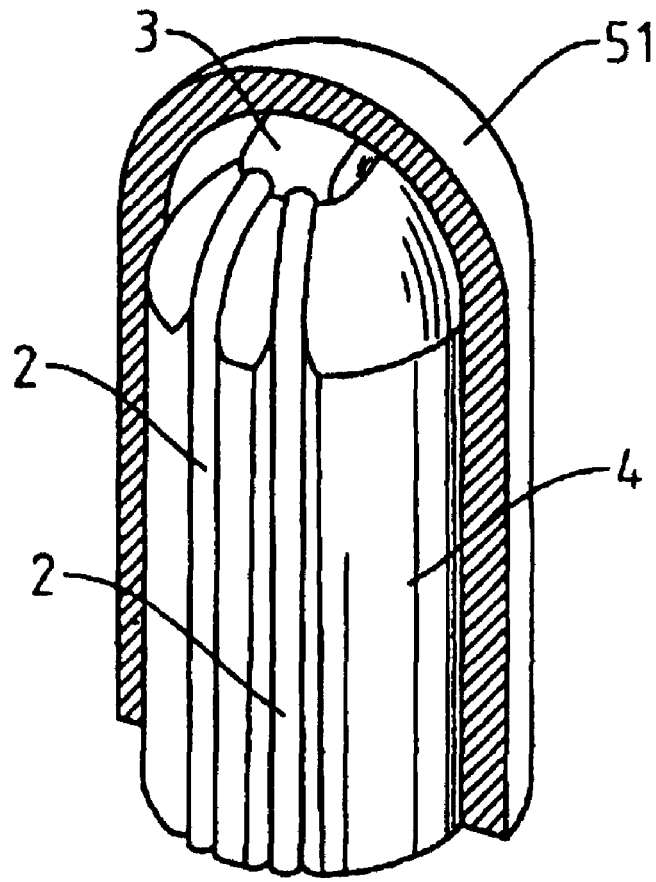

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–4 are cancelled.

* * * * *